US008782052B2

(12) United States Patent
Park et al.

(10) Patent No.: US 8,782,052 B2
(45) Date of Patent: Jul. 15, 2014

(54) TAGGING METHOD AND APPARATUS OF PORTABLE TERMINAL

(75) Inventors: Hyun Mi Park, Seoul (KR); Yu Ran Kim, Seoul (KR); Dae Won Kim, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 367 days.

(21) Appl. No.: 12/718,590

(22) Filed: Mar. 5, 2010

(65) Prior Publication Data

US 2010/0260421 A1    Oct. 14, 2010

(30) Foreign Application Priority Data

Apr. 13, 2009  (KR) ........................ 10-2009-0031843

(51) Int. Cl.
*G06F 7/00*   (2006.01)
*G06F 17/00*  (2006.01)
*G06F 17/30*  (2006.01)
*G06F 15/16*  (2006.01)

(52) U.S. Cl.
USPC ........... 707/741; 707/737; 707/915; 707/921; 715/231

(58) Field of Classification Search
USPC .................. 707/741, 737, 915, 921; 715/231
See application file for complete search history.

(56) References Cited

U.S. PATENT DOCUMENTS

| | | | | |
|---|---|---|---|---|
| 6,574,629 | B1 * | 6/2003 | Cooke et al. | 707/999.01 |
| 7,975,231 | B2 * | 7/2011 | Hasuike et al. | 715/231 |
| 2004/0205542 | A1 * | 10/2004 | Bargeron et al. | 707/999.003 |
| 2004/0268264 | A1 * | 12/2004 | Kondo | 715/751 |
| 2005/0080804 | A1 * | 4/2005 | Bradshaw et al. | 707/102 |
| 2007/0233738 | A1 * | 10/2007 | Weinberger et al. | 707/999.107 |
| 2008/0133706 | A1 * | 6/2008 | Chavez et al. | 709/218 |
| 2009/0327856 | A1 * | 12/2009 | Mouilleseaux et al. | 715/230 |
| 2011/0161174 | A1 * | 6/2011 | Simms et al. | 707/737 |

* cited by examiner

*Primary Examiner* — Greta Robinson
*Assistant Examiner* — Brian E. Weinrich
(74) *Attorney, Agent, or Firm* — Cha & Reiter, LLC

(57) ABSTRACT

A tagging method and apparatus of a portable terminal in which, if particular content is edited, only second tag information corresponding to the edited content is extracted and then automatically tagged to the edited content. The second tag information is part of the first tag information corresponding to a photography subject contained in the particular content.

19 Claims, 4 Drawing Sheets

TAGGING METHOD AND APPARATUS OF PORTABLE TERMINAL

CLAIM OF PRIORITY

This application claims the benefit under 35 U.S.C. §119(a) from a Korean patent application filed in the Korean Intellectual Property Office on Apr. 13, 2009 and assigned Serial No. 10-2009-0031843, the entire disclosure of which is hereby incorporated by reference.

BACKGROUND OF THE INVENTION

1. Field of the Invention

The present invention relates to tags and tagging technology. More particularly, the present invention relates to a tagging method and apparatus of a portable terminal for tagging content to aid in a searching/retrieval of such tagged content.

2. Description of the Related Art

A tag is a keyword used to represent certain content or search for relevant content. Tagging is a function used to input a tag into corresponding content. Tagging is typically performed by a manual tagging scheme whereby a user directly inputs keywords and/or by an automatic tagging scheme whereby a keyword is automatically extracted from the metadata of the content and then input to corresponding content.

In recent years, with the development of communication technology, Internet service providers offer a variety of web-services that allows users to upload a variety of contents, for example, still images or moving images, to websites, to manage them, and to share them with other users. The websites refers to homepages, blogs, web cafés, and Internet photo album websites, etc. As such web-services are activated, the Internet users have an interest in the edit of contents. For example, a user can combine several photo images into one, cutting off a part of the images, etc., and then upload it to a web server providing web services. The edited content, however, does not contain the tag information. That is, the conventional content edit method is disadvantageous in that users need to manually directly input tag information to the edited content, as content once edited can become untagged.

SUMMARY OF THE INVENTION

The present invention provides a tagging method and apparatus of a portable terminal that permits editing of the content and automatically inputting tag information to the edited content.

In accordance with an exemplary embodiment of the present invention, the present invention provides a tagging method of a portable terminal that preferably includes: selecting particular content; extracting first tag information contained in the particular content; selecting an area of the particular content and creating edited content; extracting second tag information corresponding to the edited content, wherein the second tag information is part of the first tag information; and automatically tagging the edited content with the second tag information.

In accordance with another exemplary embodiment of the present invention, the present invention provides a tagging apparatus of a portable terminal that preferably includes: a display unit for outputting a screen for editing particular content; and a tag managing unit (i.e. tag manager) for extracting first tag information contained in the particular content. If an area of the particular content is selected to create edited content, the tag manager also extracts second tag information corresponding to the edited content, and automatically tags the edited content with the second tag information. The second tag information is part of the first tag information.

BRIEF DESCRIPTION OF THE DRAWINGS

The above and other exemplary aspects, features and advantages of certain exemplary embodiments of the present invention will become more apparent from the following description taken in conjunction with the accompanying drawing, in which.

DETAILED DESCRIPTION

Figure 1:
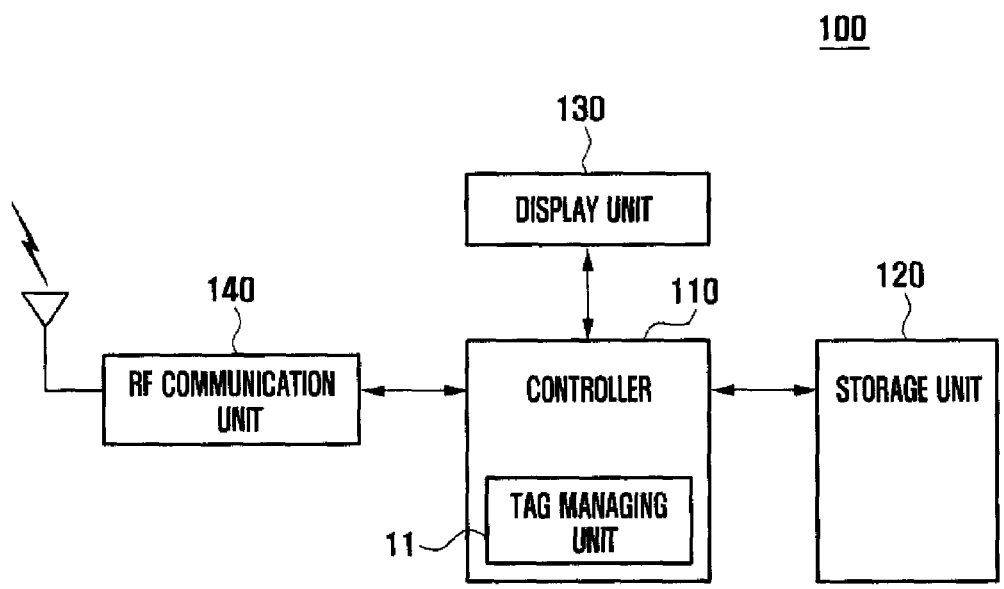
FIG. 1 is a schematic block diagram illustrating a portable terminal according to an exemplary embodiment of the present invention.

Hereinafter, exemplary embodiments of the present invention are described in detail with reference to the accompanying drawings. Detailed descriptions of well-known functions and structures incorporated herein may be omitted to avoid obscuring appreciation of the subject matter of the present invention by a person of ordinary skill in the art.

The terms or words described in the present description and the claims should not be limited by a general or lexical meaning, instead should be analyzed as a meaning and a concept through which the inventor defines and describes the present invention at his most effort, to comply with the idea of the present invention. Therefore, one skilled in the art will understand that the exemplary embodiments disclosed in the description and configurations illustrated in the drawings are only preferred exemplary embodiments, instead there may be various modifications, alterations, and equivalents thereof to replace the exemplary embodiments at the time of filing this application.

FIG. 1 is a schematic block diagram illustrating a portable terminal according to an embodiment of the present invention.

Referring now to FIG. 1, the portable terminal 100 preferably includes a controller 110, a storage unit 120, a display unit 130, and an RF communication unit 140.

The RF communication unit 140 performs a communication function of the portable terminal 100. That is, the RF communication unit 140 establishes a communication channels with a mobile communication network and allows the portable terminal 100 to make a voice call, a video telephony call or a data call. To this end, the RF communication unit 140 is configured to include an RF transmitter for up-converting the frequency of transmitted signals and amplifying the transmitted signals and an RF receiver for low-noise amplifying received RF signals and down-converting the frequency of the received RF signals.

The RF communication unit 140 receives the contents (for example, still images or moving images) from a content server (not shown). The RF communication unit 140 uploads corresponding content to a particular website, for example, a homepage, a blog, a web café, or the like. In an exemplary embodiment of the present invention, the content to be uploaded may be automatically tagged with tag information.

The storage unit 120 stores information relevant to the operation of the portable terminal 100, and other applications. In addition, the storage unit 120 also stores application programs required to communicate with a mobile communication network and data generated when the application programs are executed. That is, the storage unit 120 stores an operating system (OS) for booting up the portable terminal 100, and application programs required to operate the function of the portable terminal 100, and data generated when the portable terminal 100 is operated. The storage unit 120 is preferably comprised of a read only memory (ROM), random access memory (RAM), etc.

The storage unit 120 may also store contents and edited contents that can include tag information. The contents may be still images and moving images. The contents and edited contents contain tag information. For example, the tag information according to the photography subject may be included in the contents and edited contents.

The storage unit 120 may store a photography subject recognition program, for example, a face recognition program, an object recognition program, etc. The photography subject recognition program extracts feature information regarding a photography subject from the content, and compares the extracted feature information with that of a stored photography subject, thereby recognizing the photography subject. To this end, the storage unit 120 stores the feature information regarding a photography subject, for example, a person, an object, etc. For example, if the photography subject is a person, the storage unit 120 stores the feature information regarding the person, associated with a phone book of the portable terminal 100. It is also possible that, for example, a face recognition program works in conjunction with a server processor in communication with the portable terminal 100. Since the photography subject recognition technology is well-known to the ordinary person skilled in the art, its detailed description will be omitted in this application.

The storage unit 120 preferably stores an application program for editing contents. The content edit program can edit the content, cutting off a part of the content. For example, if the content is a still image, the content edit program generates an edit image, cutting off (i.e. "cropping") a certain area of the still image, selected by a user. The content edit program may, for example, generate the edit image in a polygon shape, such as, for example a substantially rectangular shape containing the selected area. On the other hand, if the content is a moving image, the content edit program generates an edited moving image, cutting off a certain range from a beginning frame to an ending frame, selected by the user.

The display unit 130 outputs screen data, generated when the portable terminal 100 is operated, and state information according to a user's key operation and function settings. The display unit 130 may also display a variety of signals and color information output from the controller 110. The display unit 130 may be implemented with a liquid crystal display (LCD), an organic light emitting diode (OLED), etc. If the display unit 130 is implemented with a touch screen, it may also serve as an input device. In an exemplary embodiment of the present invention, the display unit 130 displays a screen to edit particular content, for example, an edit screen for cutting off a certain area of content and for generating edited content. This process will be explained, in detail, later, with reference to FIGS. 3 and 4.

The controller 110 controls the entire operation of the portable terminal 100 and signal flows among the elements in the portable terminal 100. Examples of the elements are the RF communication unit 140, the display unit 130, the storage unit 120, etc. In an exemplary embodiment of the present invention, the controller 110 extracts first tag information corresponding to particular content. In particular, if the particular content is edited and accordingly the edited content is generated, the controller 110 automatically inputs second tag information corresponding to the edited content. To this end, the controller 110 may include a tag manager 11.

With continued reference to FIG. 1, the tag manager 11 serves as a device for managing (inputting or extracting) tag information regarding the contents. The tag manager 11 extracts tag information contained in the particular content. If tag information does not exist in the content, the tag manager 11 preferably recognizes a photography subject included in the particular content (hereinafter called the original content), using a photography subject recognition program (for example, a face recognition program or an object recognition program) stored in the storage unit 120, and then extracts tag information corresponding to the photography subject, which is hereinafter called first tag information. Also, if a user edits the original content and creates new content (hereinafter called edited content), the tag manager 11 extracts only tag information corresponding to the photography subject included in the edited content, which is hereinafter called second tag information, and inputs the extracted tag information to the edited content. The second tag information is part of the first tag information. For example, if the original image of three people is edited to an image showing two people, the tag manager 11 extracts first tag information regarding three people from the original image and second tag information related to two people in the edited image, and then inputs the second tag information to the edited image, where the second tag information is now part of the first tag information.

If the user inputs new tag information to the edit content via an input unit (not shown), i.e., in a manual tagging process, where the tag information is called third tag information, the tag manager 11 additionally input the third tag information to the edited content.

The controller 110 performs a content edit function. For example, if a user selects an area in the original image, such as a still image, etc. to edit the original image, the controller 110 may generate an edit image containing the area. Additionally, in order to edit a moving image, the controller 110 extracts only image data between the beginning frame and the ending frame, which are selected by a user, and then generates an edited moving image. The content edit technology is well-known to the ordinary person skilled in the art, so its detailed description will be omitted in this application.

After completing the tagging process and then receiving a storing command, the controller 110 controls the storage unit 120 to store the edited content.

Although it is not shown in the drawings, the portable terminal 100 may be configured to selectively further include units having add-on functions as follows: a camera module for capturing still images or moving images; a short-range communication module for performing short-range communication; a broadcast receiver module; a digital audio source reproducing module, such as an MP3 module; and an Internet communication module for performing communicating with an Internet network and an Internet function, just to name a few possibilities. With the spread of digital convergence, although not possible to list all the potential modifications in this description, it will be easily appreciated to those skilled in the art that the other units equivalent to the above-listed units may be further included to the portable terminal according to the present invention. Also while the portable terminal is preferred for illustrative purposes, the present invention is operable on other types of devices, including but in no way limited to notebook computers, laptop computers, tablets, PDAs, etc.

Figure 2:
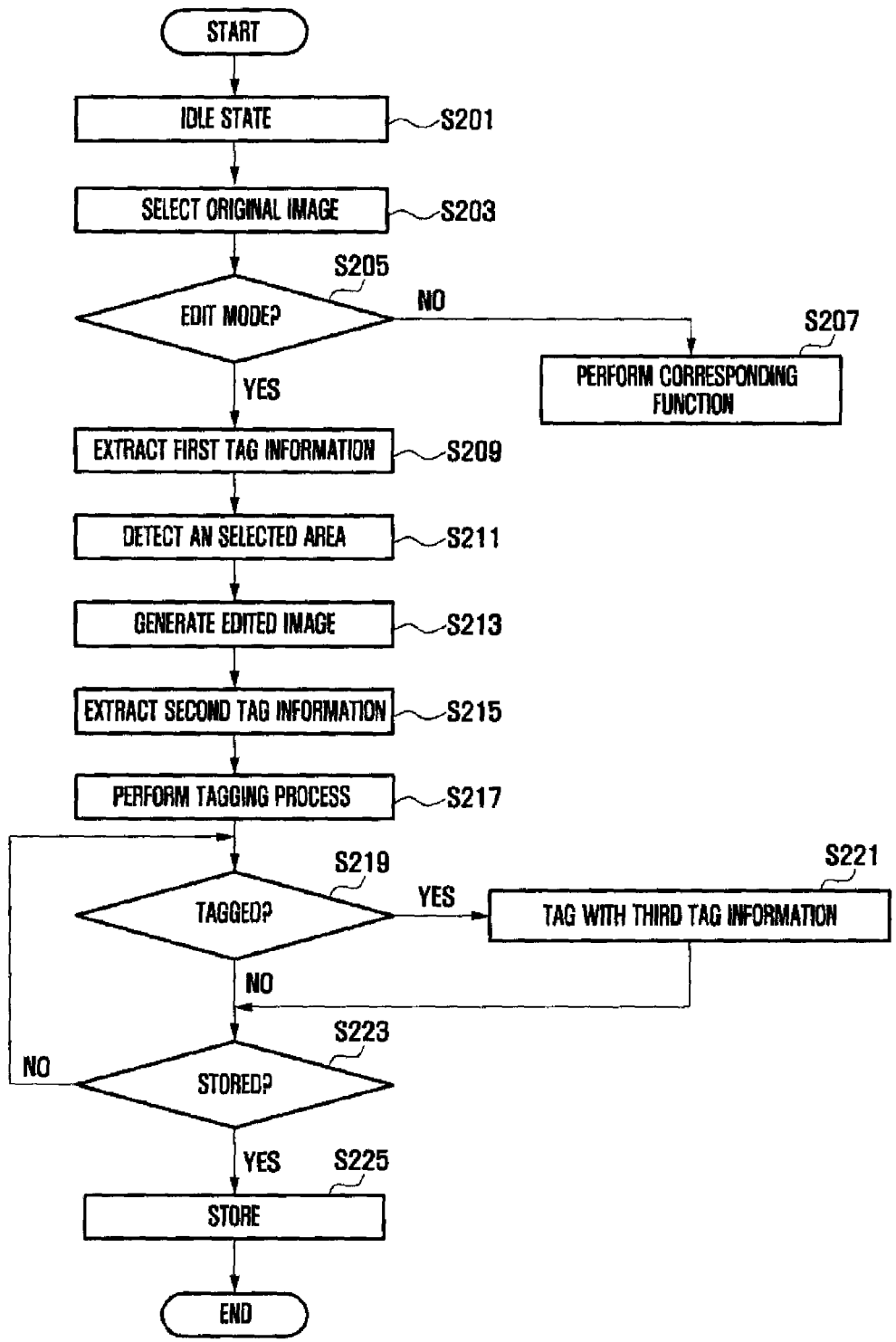
FIG. 2 is a flow chart that describes a tagging method of a portable terminal, according to an exemplary embodiment of the present invention.

FIG. 2 is a flow chart illustrating exemplary operation of a tagging method of a portable terminal, according to an exemplary embodiment of the present invention.

In an exemplary embodiment of the present invention, for the sake of convenience, although the tagging method is explained based on a still image, it should be understood by a person of ordinary skill in the art that the present invention is not limited to the exemplary embodiment described herein. For example, the tagging method may also be applied to moving images, including those previously recorded and those, for example, received by a camera module of the portable terminal.

Referring now to FIGS. 1 and 2, at step (S201) the portable terminal 100 is turned on and then operated in an idle state. At step (S203) the controller 110 detects the selection of a particular still image, which is hereinafter referred to as the "original image".

At step (S205), the controller 110 determines whether an edit mode is activated. If the controller 110 ascertains that an edit mode is not activated, at step (S207) the controller controls performance of a corresponding function. For example, the controller 110 may attach the original image to a text message or set it as a background image for the idle screen.

On the contrary, if the controller 110 ascertains that an edit mode is activated, at step (S209) the associated tag manager 11 extracts first tag information. The first tag information may comprise tag information contained in the original image, and/or tag information corresponding to a photography subject included in the original image. If first tag information does not exist in the original image, the tag manager 11 recognizes a photography subject included in the original image and extracts the first tag information, using the photography subject recognition program. To this end, the storage unit 120 may store a photography subject recognition program and feature information regarding the photography subject. The photography subject recognition program may include, for example, a face recognition program or an object recognition program.

After extracting tag information as discussed above, at step (S211) the controller 110 detects the selection of a certain area in the original image. When the controller 110 ascertains that a certain area has been selected in the original image, then at step (S213) the controller 110 generates an edited image containing the selected area. In an exemplary embodiment of the present invention, although the controller 110 generates the edited image in a rectangle shape, it should be understood that the present invention is not limited to the exemplary embodiment.

At step (S215), the tag manager 11 extracts second tag information, and at step (S217) the tag manager 11 tags the edited image with the extracted second tag information. The second tag information is part of the first tag information and refers to tag information corresponding to a photography subject contained in the edited image.

At step (S219), the controller 110 determines whether or not a tagging menu is activated. If a tagging menu has been activated, then at step (S221) the controller 110 tags the edited image with tag information manually input by a user, which is hereinafter called third tag information. To this end, the controller 110 outputs a tag information input window on the display unit 130.

At step (S223), after tagging the edited image with the third tag information, the controller 110 checks whether a command for storing the edited image is input. If the controller 110 ascertains that a command for storing the edited image is input, at step (S225) the controller 110 stores the edited image and then terminates the tagging process in the portable terminal 100. On the contrary, if the controller 110 ascertains that a command for storing the edited image is not input, the operation returns to the output of step S219. Meanwhile, if a tagging menu has not been activated, the controller 110 checks whether a command for storing the edited image is input at S223. Alternatively, if a termination (cancel) command is input, the controller 110 may return to a process of displaying an idle screen, without storing the edited content.

Although it is not shown in the drawings, the exemplary embodiment can be modified in such that, after the edited image is created, another edited image may be created by selecting a certain area in the image. That is, a certain area is selected in the original image to create a first edited image. After that, another area is selected in the first edited image to create a second edited image. In that case, the tag manager 11 extracts only tag information corresponding to the second edited image from tag information regarding the first edited image and then automatically inputs it to the second edited image.

In an exemplary embodiment of the present invention described above, although the tagging method is performed in such a way that a particular image is selected and then an edit mode is activated, it should be understood that the present invention is not limited to the embodiment. For example, the tagging method may be performed in such a way to select a particular image to be edited while activating the edit mode.

In the foregoing description, an example of a tagging method of the portable terminal according to the present invention has been explained. For more clearly understanding the feature of the tagging method, it is explained referring to screens shown on the display unit of the portable terminal.

Figure 3:
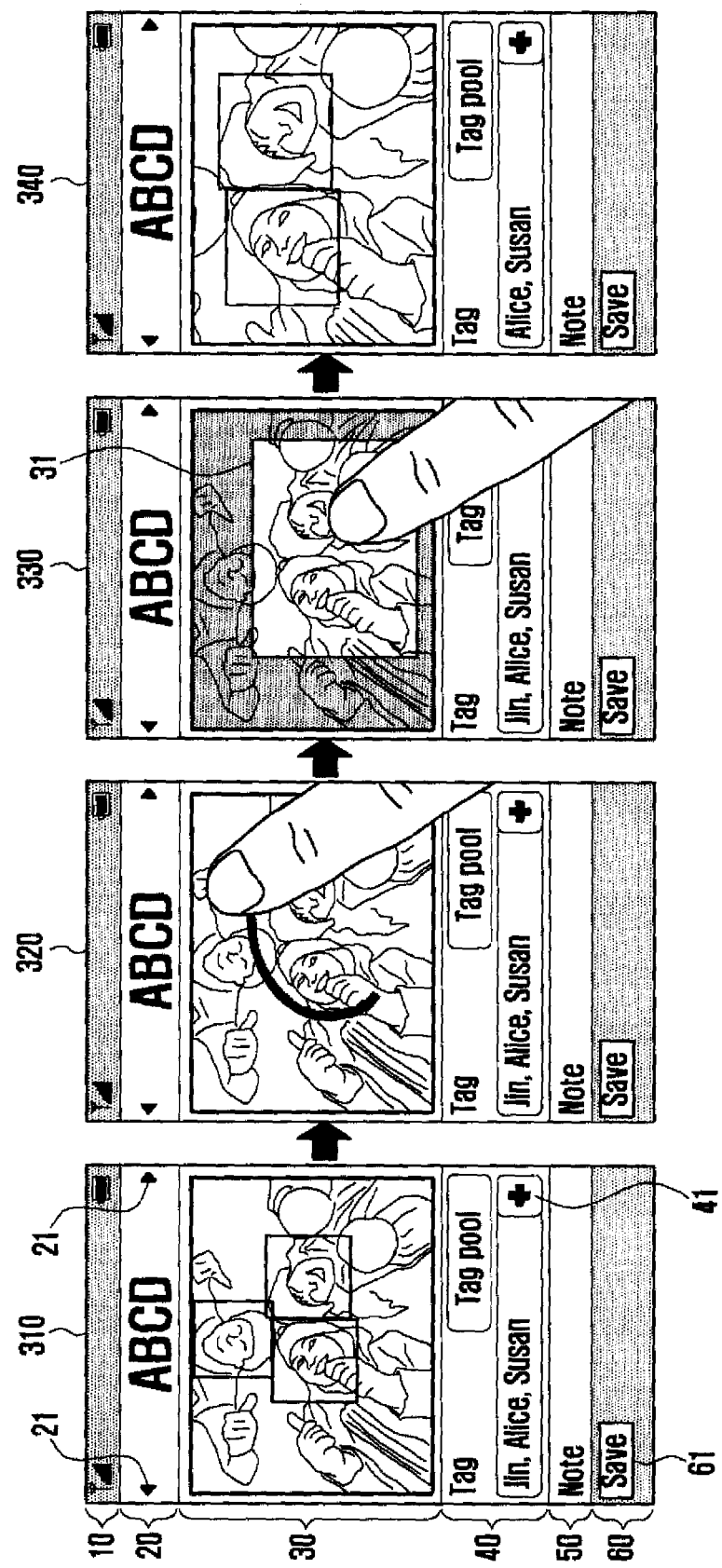
FIG. 3 illustrates screens that show a method for tagging a still image, according to an exemplary embodiment of the present invention.

FIG. 3 illustrates screens displaying a method for tagging a still image, according to an exemplary embodiment of the present invention.

Referring now to FIGS. 1 and 3, when a user selects a particular image (original image) and then activates an edit mode, the display unit 130 displays a first screen 310. The first screen 310 displays an indicator area 10, a website selection area 20, a content display area 30, a tag information display area 40, a memo area 50, and a menu area 60.

The indicator area 10 comprises an area that displays icons related to a RSSI, a remaining battery, an alarm setting of the portable terminal 100, etc. The website selection area 20 displays information regarding websites to which the contents are uploaded. In an exemplary embodiment of the present invention, the website provides web services, such as homepages, blogs, and web cafes. The information regarding websites in the website selection area 20 may be changed by touching the arrow cursors 21 located at both sides of the website selection area 20.

The content display area 30 displays particular content that will be edited as well as the already-edited content. For example, if the original image is displayed on the content display area 30 in the first screen 310 and then a user selects a certain area, the content display area 30 displays an edited image as shown on a fourth screen 340.

The tag information display area 40 displays the first tag information, extracted from the original image, or the second tag information corresponding to the edited image. The first tag information may be the stored tag information or the tag information corresponding to a photography subject contained in the original image, which is extracted by the tag manager 11 using a photography subject recognition program. The tag information display area 40 may further include a tagging menu 41 for tagging the original image or the edited image with tag information.

The memo area 50 displays a brief comment made about particular content. The menu area 60 displays a current available menu. In an exemplary embodiment of the present invention shown in FIG. 3, although the menu area 60 includes a save menu item 61, a person of ordinary skill in the art should understand that the present invention is not limited to the examples shown herein. For example, the menu area 60 may further include an upload menu item for uploading particular content or edited content to a preset website.

As shown in FIG. 3, the user may select a certain area of the original image displayed on a second screen 320. That is, if the user selects an area of the original image on the second screen 320, the controller 110 creates an edited image 31 containing a user's selected area as shown on a third screen 330. In an exemplary embodiment of the present invention shown in the third screen 330, although the edited image 31 is selected in a polygon shape, a person of ordinary skill in the art should understand that the present invention is not limited to the examples shown herein. In addition, in an embodiment of the present invention shown in FIG. 3, although the display unit 130 is implemented with a touch screen and a certain area is selected by the user's finger, the portable terminal 100 may also be implemented with a pointing device, such as an optical joystick, etc. In that case, a certain area can be selected from the displayed image by the pointing device.

After creating the edited image 31, the tag manager 11 extracts second tag information corresponding to the edited image 31. The second tag information is part of the first tag information. The controller 110 enlarges and displays from the selected area displayed on the third screen 330 to an edited image on the content display area 30 in the fourth screen 340. In that case, the second tag information, for example, 'Alice' and 'Susan,' has already been tagged to the edited image 31. For example, when comparing the first screen 310 with the fourth 340, the tag information display area 40 alters the first tag information, 'Jin, Alice, Susan,' to the second tag information, 'Alice, Susan.' After the tag information display area 40 alters the first tag information, 'Jin, Alice, Susan,' to the second tag information, 'Alice, Susan, the user may save the edited image 31 by activating the save menu 61 in the menu area 60 or may tag the edited image 31 with the third tag information using the tagging menu 41.

Figure 4:
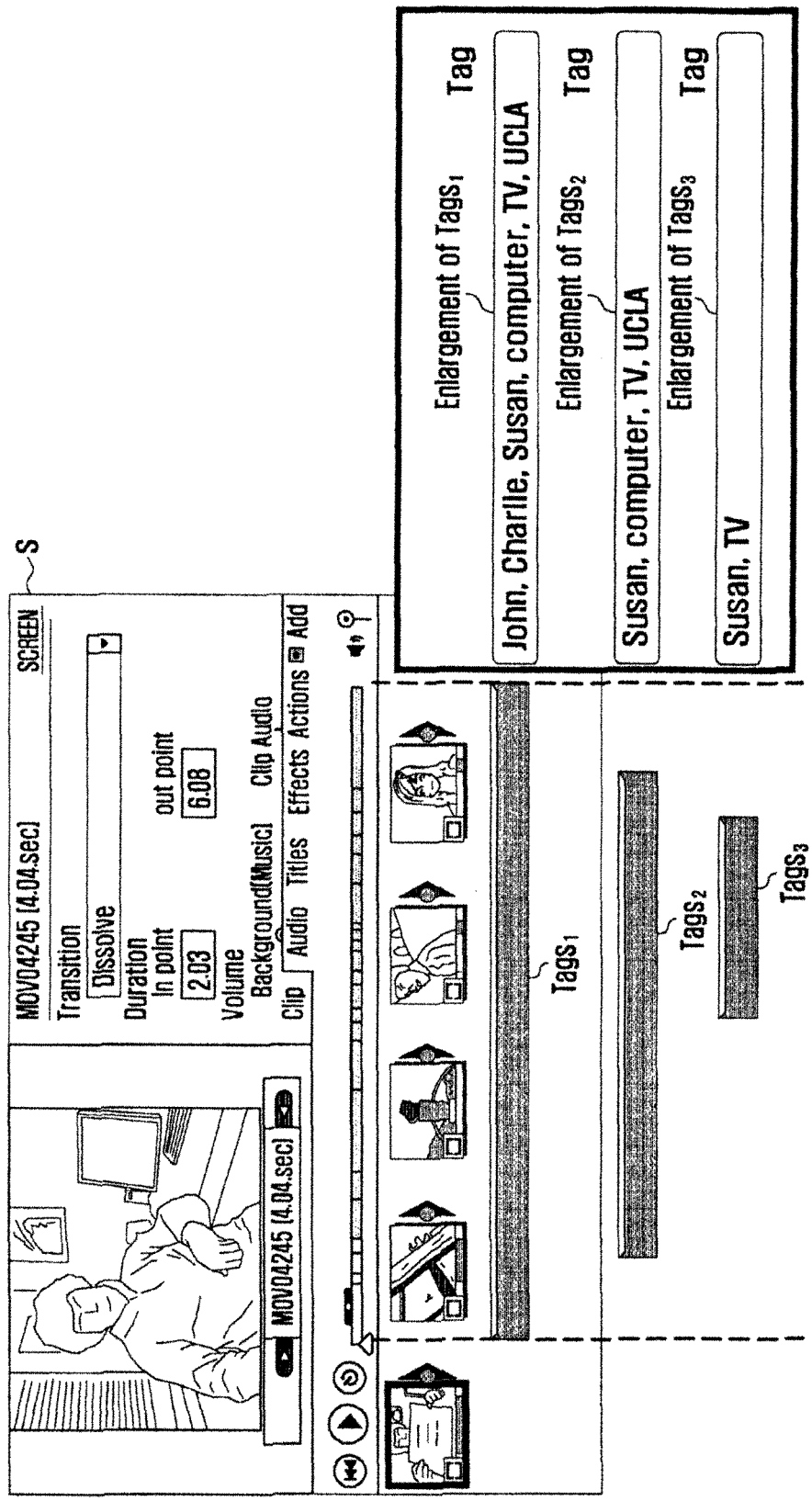
FIG. 4 illustrates a screen showing a method for tagging a moving image, according to an exemplary embodiment of the present invention.

FIG. 4 illustrates a screen showing a method for tagging a moving image, according to an exemplary embodiment of the present invention.

Referring now to FIGS. 1 and 4, when a user selects a particular moving image and then activates an edit mode, the display unit 130 displays a screen S for editing a moving image. The moving image is composed of video and voice data and tag information. The tag information is contained in the moving image, synchronizing with the moving image, as the video data and the subtitle data are synchronized with each other. If an edited moving image is created by cutting off part of the moving image, the tag manager 11 extracts the tag information corresponding to the edited moving image. For example, as shown in FIG. 4, if a first edited moving image is created by cutting off a part of the original moving image that contains first tag information ("Tags$_1$"), 'John, Charlie, Susan, computer, TV, UCLA,' the second tag information ("Tags$_2$") tagged to the first edited image may be 'Susan, computer, TV, UCLA.' Furthermore, if a second edited moving image is created by cutting off a part of the first edited image or the original image, modified second tag information ("tags$_3$") may be 'Susan, TV.'

As described above, the tagging method and apparatus of the portable terminal, according to the present invention, can automatically input the tag information corresponding to the edited content to the content, thereby user convenience. The tagging method and apparatus can also extract tag information and perform a tagging process using a face recognition function, thereby tagging the content with the tag information, with the high precision.

The above-described methods according to the present invention can be realized in hardware or as software or computer code that can be stored in a recording medium such as a CD ROM, a RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although the invention has been shown and described with respect to exemplary embodiments thereof, it should be understood that these embodiments are only illustrative and not intended to limit the scope of the invention. Therefore, one skilled in the art will understand that the exemplary embodiments disclosed in the description and configurations illustrated in the drawings are only preferred embodiments, instead there may be various modifications, alterations, and equivalents thereof, without departing from the scope and sprit of the invention as described in the accompanying claims.

What is claimed is:

1. A tagging method for tagging content in a portable terminal, comprising:
   detecting selection of a still image as particular content;
   extracting first tag information contained in the still image, the first tag information containing a first plurality of tags corresponding to a respective first plurality of objects in the still image;
   detecting selection of an area of the still image less than an entirety of the still image and creating edited content as a new still image including the selected area, in which a portion of the selected still image is removed;
   extracting second tag information corresponding to the edited content automatically upon detecting the selection of the area, wherein the second tag information is part of the first tag information corresponding to the selected area, wherein tags corresponding to objects of the selected still image outside the selected area are excluded, and
   automatically, tagging the edited content with the second tag information;
   wherein extracting second tag information comprises:
   recognizing feature information regarding an object included in the edited content via operation of a photography subject recognition program; and
   comparing the feature information regarding a stored photography subject with that of the recognized object, and extracting the second tag information.

2. The method of claim 1, wherein the objects comprise persons.

3. The method of claim 1, further comprising:
   storing the edited content tagged with the second tag information.

4. The method of claim 1, further comprising:
tagging the edited content with third tag information descriptive of the edited content.

5. The method of claim 1, wherein creating the edited content comprises:
cutting off an area of the still image in a polygon shape.

6. The method of claim 1, wherein extracting first tag information comprises:
recognizing feature information regarding an object included in the particular content via operation of a photography subject recognition program; and
comparing the feature information regarding a stored photography subject with that of the recognized object, and extracting the first tag information.

7. The method of claim 1, wherein:
detecting selection of an area comprises detecting selection of a non-polygonal area coinciding with the user input; and
the new still image is created in a polygonal shape encompassing the selected non- polygonal area.

8. The method of claim 1, wherein the area of the detected selection of the still image coincides with a detected user drag input on a display of the portable terminal.

9. A tagging apparatus of a portable terminal comprising:
a display unit for outputting a screen for editing a selected still image as particular content, the screen including a tag information display area; and
a tag manager for extracting first tag information contained in the still image, the first tag information containing a first plurality of tags corresponding to a respective first plurality of objects in the still image, the first tage information being displayed in the tag information display area;
a controller for detecting selection of an area of the still image, coinciding with a user input on the display unit, the area being less than an entirety of the still image, and for creating edited content as a new still image which is an enlarged version of a part of the selected still image that contains the selected area, in which a portion of the selected still image is removed;
wherein the tag manager further extracts second tag information corresponding to the created edited content automatically upon detecting the selection of the area, by recognizing feature information regarding an object included in the edited content via operation of a photography subject recognition program. and comparing the feature information regarding a stored photography subject with that of the recognized object; and automatically tags the edited content with the second tag information, wherein the second tag information is a subset of the first tag information and contains tags for objects within the selected area, while excluding tags of the first tag information for objects of the selected still image outside the selected area, and the extracted second tag information automatically replaces the first tag information in the tag information display area.

10. The tagging apparatus of claim 9, wherein the screen for editing comprises:
a content display area for displaying the particular content; and
the tag information display area is displayed in proximity to the content display area.

11. The tagging apparatus of claim 10, wherein the tag information display area comprises:
a tagging menu display area for tagging the edited content with third tag information.

12. The tagging apparatus of claim 9, wherein the objects comprise persons.

13. The tagging apparatus of claim 12, wherein the controller cuts off the edited content in a predetermined polygonal shape.

14. The tagging apparatus of claim 9, further comprising:
a storage unit for storing the edited content tagged with the second tag information.

15. The tagging apparatus of claim 14, wherein:
the storage unit comprises a machine readable medium and stores executable software comprising a photography subject recognition program and feature information regarding a photography subject; and
the tag manager recognizes a photography subject, contained in the particular content and the edited content, using the photography subject recognition program, and extracts tag information.

16. The tagging apparatus of claim 11, wherein the third tag information is manually entered.

17. The tagging apparatus of claim 13, wherein the predetermined polygonal shape is rectangular.

18. The tagging apparatus of claim 9, wherein:
the detected selected area is a non-polygonal area coinciding with the user input; and
the new still image is created in a polygonal shape encompassing the selected non-polygonal area.

19. The tagging apparatus of claim 9, wherein the user input is a user drag input.

\* \* \* \* \*

UNITED STATES PATENT AND TRADEMARK OFFICE
CERTIFICATE OF CORRECTION

| | | |
|---|---|---|
| PATENT NO. | : 8,782,052 B2 | Page 1 of 1 |
| APPLICATION NO. | : 12/718590 | |
| DATED | : July 15, 2014 | |
| INVENTOR(S) | : Hyun Mi Park et al. | |

It is certified that error appears in the above-identified patent and that said Letters Patent is hereby corrected as shown below:

In the Claims:

Column 8, Claim 1, Lines 52-53 should read as follows:
--...area are excluded; and...--

Column 9, Claim 7, Line 20 should read as follows:
--...selected non-polygonal area...--

Column 9, Claim 9, Lines 31-32 should read as follows:
--...the first tag information...--

Column 9, Claim 9, Line 46 should read as follows:
--...recognition program, and comparing...--

Signed and Sealed this
Thirtieth Day of September, 2014

Michelle K. Lee
*Deputy Director of the United States Patent and Trademark Office*